United States Patent [19]

Persells et al.

[11] Patent Number: 5,517,801

[45] Date of Patent: May 21, 1996

[54] LIFTER MECHANISM EMPLOYING A CARTON GRIPPER AND CARTON BOTTOM SEAL CONFIGURATION FOR USE THEREWITH

[76] Inventors: David L. Persells, 613 Torrey Pines, Twin Lakes, Wis. 53181; Roland J. E. Andersson, 2786 Old Buffalo Grove Rd., Arlington Heights, Ill. 60004; Shigehiro Kinoshita, 1124 Johnson Dr., Apt. 3536, Buffalo Grove, Ill. 60089; Felix Dunge, Via Rua del Muro 108, 41100 Modena, Italy

[21] Appl. No.: 315,401

[22] Filed: Sep. 28, 1994

[51] Int. Cl.⁶ .................................................... B65B 51/10
[52] U.S. Cl. ........................ 53/374.2; 53/565; 53/371.2; 493/183; 493/184
[58] Field of Search ...................... 53/DIG. 2, 371.2, 53/371.7, 372.2, 371.8, 371.5, 374.2, 374.6, 374.8, 565, 284.5; 493/184, 183, 133, 135, 147; 219/243

[56] References Cited

U.S. PATENT DOCUMENTS

| | | |
|---|---|---|
| 3,120,089 | 2/1964 | Monroe et al. ............................. 53/565 |
| 3,212,413 | 10/1965 | Allen et al. .............................. 53/371.2 |
| 3,280,531 | 10/1966 | Meyer-Jagenberg ....................... 53/565 |
| 3,307,325 | 3/1967 | Garrett et al. ............................ 53/565 |
| 3,438,176 | 4/1969 | Reid et al. .............................. 53/372.2 |
| 3,910,014 | 10/1975 | Braun ..................................... 53/372.2 |
| 4,251,303 | 2/1981 | Deimel et al. ........................... 53/371.2 |
| 4,448,012 | 5/1984 | Kauffman et al. ......................... 53/565 |
| 4,790,123 | 12/1988 | Ljungstrom et al. ...................... 53/565 |
| 5,085,029 | 2/1992 | Esper ..................................... 53/374.8 |

Primary Examiner—John Sipos
Assistant Examiner—Gene L. Kim
Attorney, Agent, or Firm—McAndrews, Held & Malloy Ltd.

[57] ABSTRACT

A gable-bottom carton gripper is disclosed for lifting and transporting container blanks between various positions within a packaging machine. Container blanks are sealed in a gable-bottom configuration using predesigned sealing jaws. The sealing jaws feature strategically placed ribs which, during ultrasonic sealing of the container bottoms, cause the formation of a longitudinal bubble disposed along a bottom fin of each gable-bottom container. A carton gripper is adapted to grip the bottom fin while supporting the bottom panels of the container. The gripper includes a rigid member bent to conform to the shape of a gable-bottom container, with a gripping edge defining a fin channel to secure the bottom fin within a fin chamber. The longitudinal bubble prevents the fin from being displaced from the fin chamber during the lifting and transporting process.

11 Claims, 5 Drawing Sheets

LIFTER MECHANISM EMPLOYING A CARTON GRIPPER AND CARTON BOTTOM SEAL CONFIGURATION FOR USE THEREWITH

TECHNICAL FIELD

The present invention relates to a machine for manufacturing filled and sealed packaging containers. More specifically, the present invention relates to a lifter mechanism employing a carton gripper and a carton bottom seal configuration for use with the carton gripper.

BACKGROUND

Packaging machines are known that integrate the various components necessary to fill and seal a container into a single machine unit. This packaging process, generally stated, includes feeding carton blanks into the machine, sealing the bottom of the cartons, filling the cartons with the desired contents, sealing the tops of the cartons, and then off-loading the filled cartons for shipping.

Many packaging machines require one or more linearly driven mechanisms that assist in the various packaging processes. One such mechanism is set forth in U.S. Pat. No. 4,712,665 to McDonald et al. The '665 patent illustrates a container lifting mechanism that includes a vertical tube actuator that is slidably mounted in bearings within a fixed sleeve. A second vertical tube actuator is slidably mounted in bearings within the first vertical tube actuator so as to have independent vertical movement relative thereto. Vertical linear movement of the carton is accomplished by hydraulic activation of the first and second vertical tube actuators.

Trends within the field of packaging machines point toward increasingly high capacity machines intended for rapid, continuous filling and sealing of a very large number of identical or similar packaging containers, e.g., containers of the type intended for liquid contents such as milk, juice, and the like. One such machine is disclosed in U.S. Ser. No. 08/190,546, filed Feb. 2, 1994. The '546 application discloses, among other things, a mandrel-less packaging machine that utilizes a carton having a gabled bottom that is first sealed and then compressed to form a bottom on which the carton may rest. This is opposed to the mandrel-formed bottoms of prior cartons.

The lifter mechanism of the '665 patent is generally unsuitable for use with the gable-bottom cartons used in the machine disclosed in the '546 application. Accordingly, a more efficient lifting mechanism is desirable.

SUMMARY OF THE INVENTION

A gable-bottom carton gripper is disclosed that is adapted to grip a bottom fin having a defined sealing configuration while also supporting the gabled bottom panels of the container. The gripper may be disposed on a lifter mechanism that lifts the gable-bottom carton for filling.

In accordance with one embodiment of the gripper, the gripper includes a rigid member bent to substantially conform to the shape of the gabled bottom. The rigid member includes first and second inclined members disposed on opposite sides of a fin channel. The first and second inclined members are angled to generally conform to the shape of the gabled panels of the carton for support thereof. The first inclined member terminates at a gripping edge proximate the fin channel. The second inclined member abuts a guide member that inclines into the fin channel.

To utilize the gripper, the bottom fin of the container is forced through the fin channel to a fin chamber. As it passes through the fin channel, the fin is guided by the guide member until the container reaches a resting position atop the gripper. When in resting position, the bottom panels of the container are supported by the inclined members of the gripper, and the fin is secured within the fin enclosure by the gripper edge. A bottom seal configuration for use with the carton gripper is also contemplated, as well as the manner of forming the configuration. This bottom seal configuration may be achieved using the ultrasonic carton sealing apparatus described in U.S. Ser. No. 08/190,546 (Corporate Docket TRX-0082; Attorney Docket 10454US01), filed on even date herewith, and incorporated herein by reference. In accordance with one manner of forming the configuration, erected container blanks are bottom-sealed in a gable configuration by ultrasonic sealing of the opposing bottom fin panels in a liquid-tight manner between predesigned sealing jaws. The contact portion of the sealing jaws feature strategically placed ribs, such that when the container blank is sealed, a longitudinal "bubble" is formed along the bottom fin.

The gripping engagement between the carton bottom and the gripper is principally based on the shape of the gripper, the container bottom, and the fin. The combination of the shape of the gripper, the placement of the gripping edge adjacent to the bubble, and the bubble formed in a low compression area of the bottom fin increases the gripping force of the carton gripper to a commercially useable and hygienic design. The absence of bearings and moving parts in the gripper alleviates the need for frequent cleanings and allows the gripper to operate at a high hygienic level.

DETAILED DESCRIPTION OF THE PREFERRED EMBODIMENT

Figure 1:
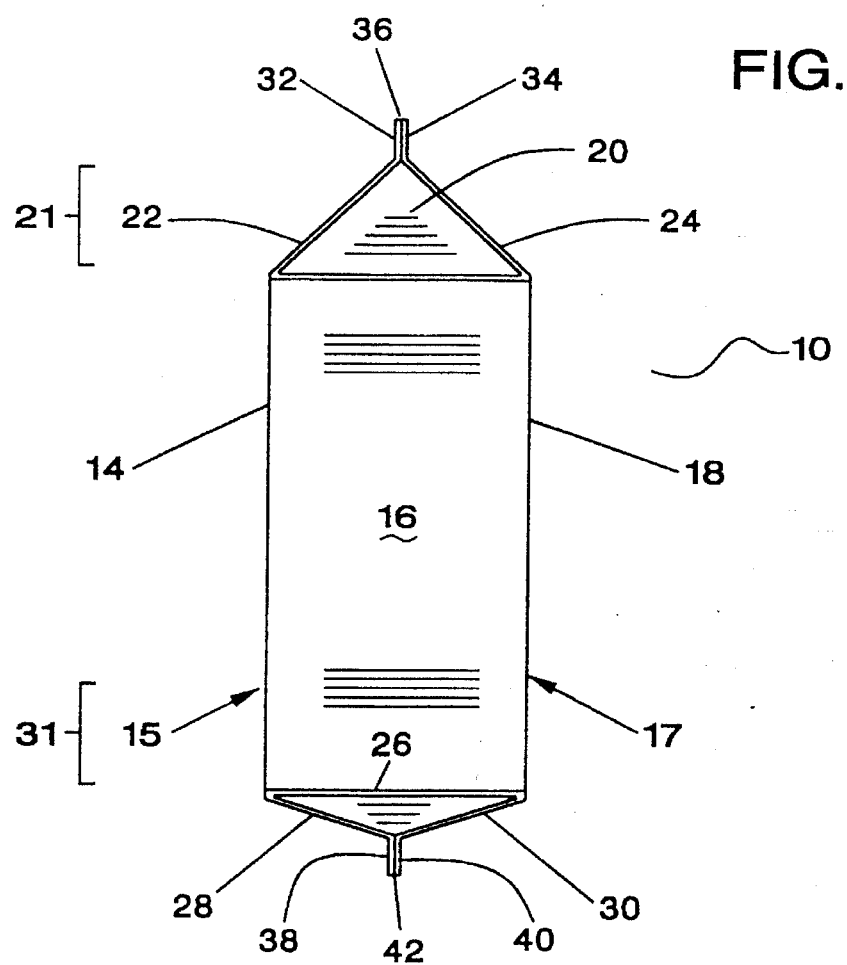
FIG. 1 is a side view of a container having a gabled top and a gabled bottom.

The carton bottom seal configuration for use with a carton gripper may be implemented in a container such as the one illustrated in the '546 application which includes a gabled bottom. Such a container 10 is illustrated in FIG. 1. Other gable-bottom carton configurations are illustrated in U.S. Ser. No. 08/238,923, filed May 6, 1994.

The container 10 is formed from a container blank having at least one external layer of thermoplastic, and includes four mutually laterally located side wall panels 14, 16, 18 which are separated by mutually parallel vertical crease lines 15, 17. (Fourth side wall panel and corresponding vertical crease lines not shown). An additional, relatively narrow sealing panel at one edge of the container blank is heat-sealed to the opposite free edge of the container blank to form a relatively square-cross-sectional container 10 defined by four side wall panels 14, 16, 18. Oppositely sloped overlying panels 22, 24, 28, 30 and underlying panels 20, 26 located at the upper and lower ends of the side panels 14, 16, 18 to define upper and lower gabled sections 21 and 31. A top fin 36 extends from the top gabled section 21 while a bottom fin 42 extends from the bottom gabled section 31. The carton bottom seal configuration may be formed at a bottom sealing work station, such as that described in the '546 application using an ultrasonic sealer such as the one disclosed in U.S. Ser. No. 08/315,412 (Attorney Docket No. 10454US01; Corporate Docket No. TRX-0082) entitled "Ultrasonic Carton Sealer", filed concurrently herewith, and incorporated by reference. The bottom sealing work station is disposed to simultaneously seal the fins of a plurality of erected container blanks. The work station includes multiple sets of predesigned sealing jaws, each set located in register with one another.

Figure 2:
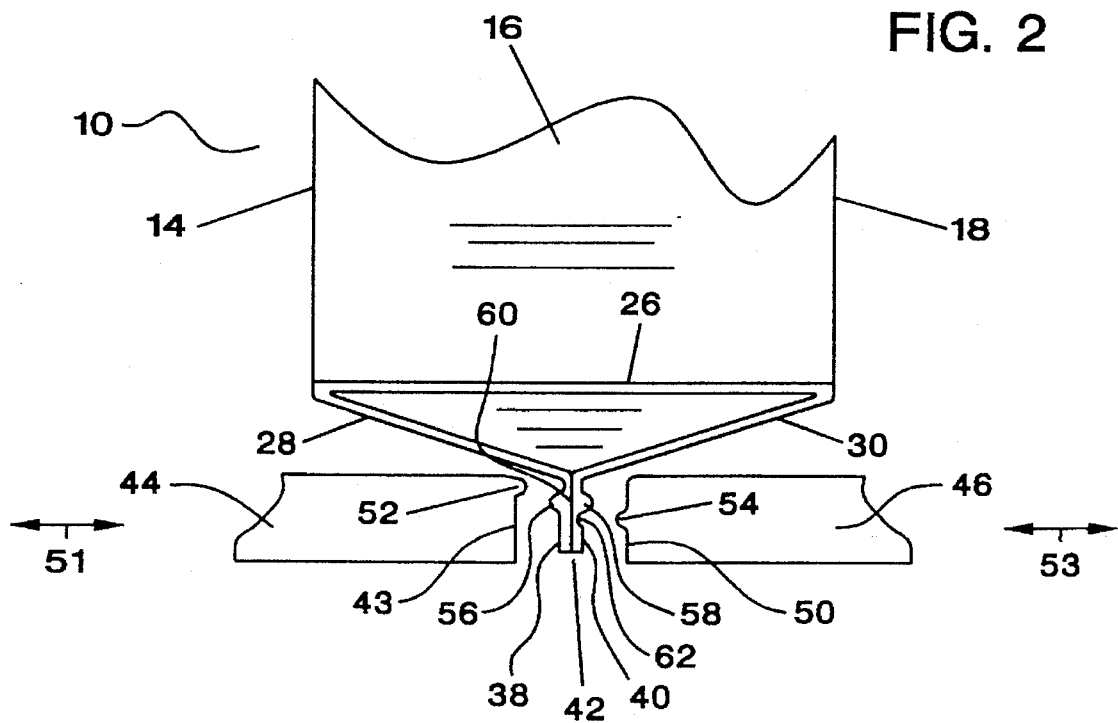
FIG. 2 is a side view of a pair of sealing jaws and the resulting bubble fin carton bottom seal configuration.

As shown in FIG. 2, each set of predesigned sealing jaws includes a first sealing jaw 44 and a second sealing jaw 46 that are movable toward and away from one another in a direction indicated by arrows 51 and 53. The first sealing jaw 44 features a generally flat face portion 48, which engages first bottom fin 38 of the fin 42 of container 10 during the sealing process. The upper portion of the work surface of the first sealing jaw 48 features a longitudinal sealing rib 52. The sealing rib 52 is characterized by a generally rounded protrusion running longitudinally across at least a portion of the upper edge of the face portion 48.

The second sealing jaw 46 features a generally flat face portion 50, which contacts a second bottom fin panel 40 of the fin 42 of the container 10 during the sealing process. The face portion 50 features a longitudinal counter rib 54 located at a position vertically displaced from the position of the longitudinal sealing rib 52 of the corresponding sealing jaw 44. The counter rib 54 is characterized by a rounded protrusion running longitudinally across at least a portion of the face portion 50.

The erected container blanks 10 are vertically positioned at the work station such that the bottom fin panels 38, 40 are substantially in registry with the sealing jaws 44 and 46. During the sealing process, the sealing jaws 44 and 46 are displaced towards one another to engage and seal the fin 42.

Pressure exerted at a location on the first bottom fin panel 38 by the longitudinal sealing rib 52 combined with pressure exerted at another location on the second bottom fin panel 40 by the longitudinal counter rib 54 results in the formation of longitudinal bubbles 56, 58 on the bottom fin 42. The sealing rib 52 forms a slight longitudinal indentation 60 just above the bubble 56 on the bottom fin 42. Likewise, the counter rib 54 forms a slight longitudinal indentation 62 just below the bubble 58 on the bottom fin. During ultrasonic sealing, the pressure on the bottom fin 42 caused by the positioning of the sealing ribs 52 and 54 may cause the bottom fin 42 to bend slightly in the direction of the first sealing jaw 44.

The triangular underlying panels 26 are pre-sealed in inwardly folded mutually facing positions between the mutually inclining bottom main panels 28, 30 so that the packaging container blank 10 will have a gable-bottom configuration, as is illustrated in FIG. 1. Carton refolders, such as those disclosed in U.S. Ser. No. 08/315,400 (Attorney Docket No. 10455US01; Corporate Docket No. TRX-0047) entitled "Apparatus For Sealing The Fin Of A Gabled Carton", filed concurrently herewith and incorporated by reference, may be used to assist in the formation of the gabled bottom. After sealing is completed, the sealing jaws 44 and 46 are returned to an open position and the bottom sealed containers 10 are transported to the next work station.

Figure 3A:
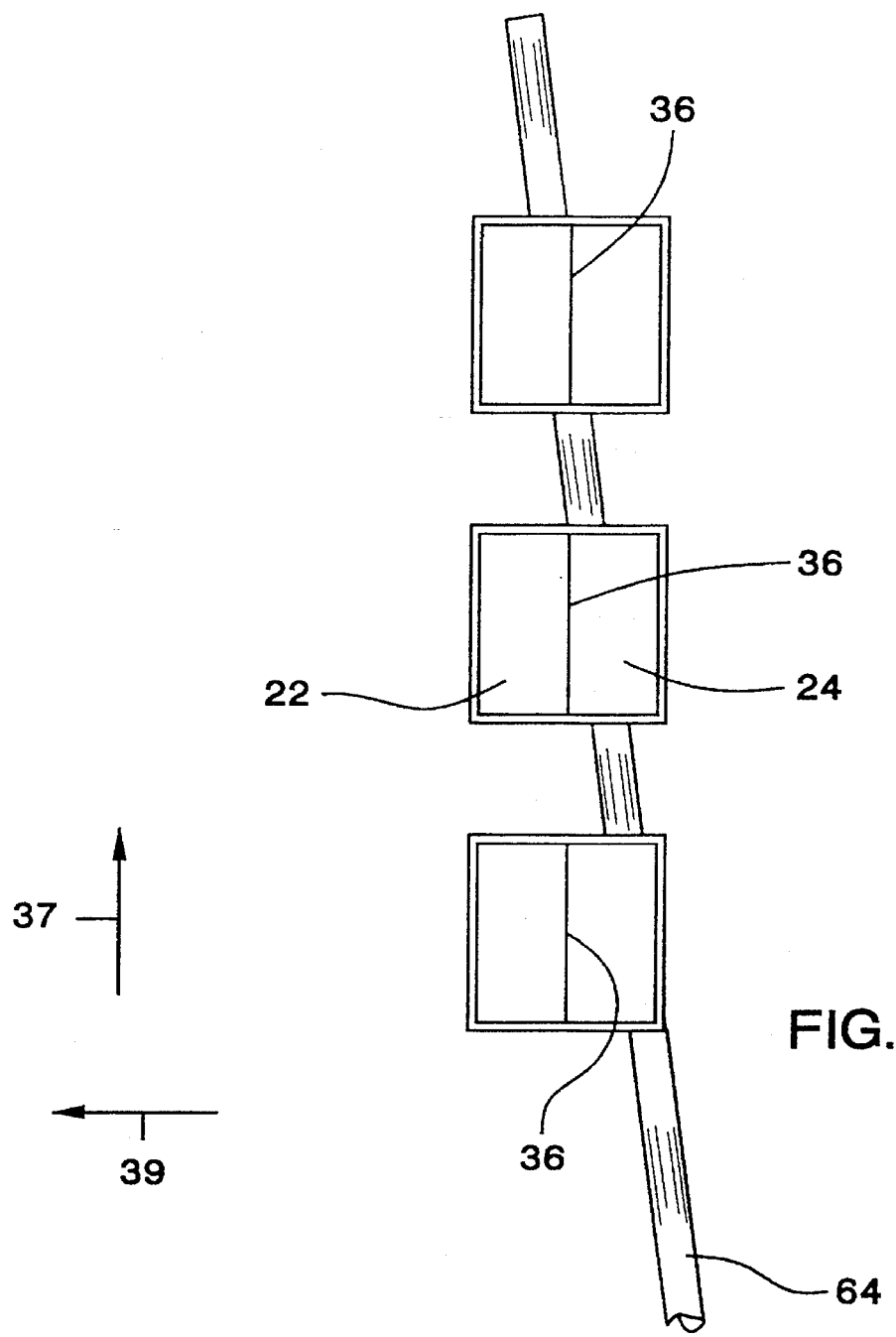
FIG. 3(A) is a top view of a pre-bending rod disposed substantially askew from the horizontal path of a conveyor.
Figure 3B:
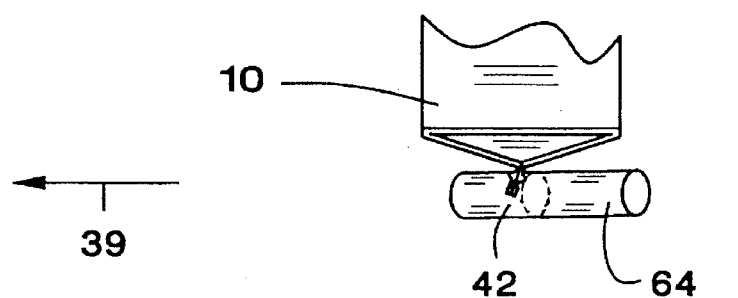
FIG. 3(B) is a perspective view of the pre-bending rod as it makes contact with the bottom fin of a container.
Figure 4A:
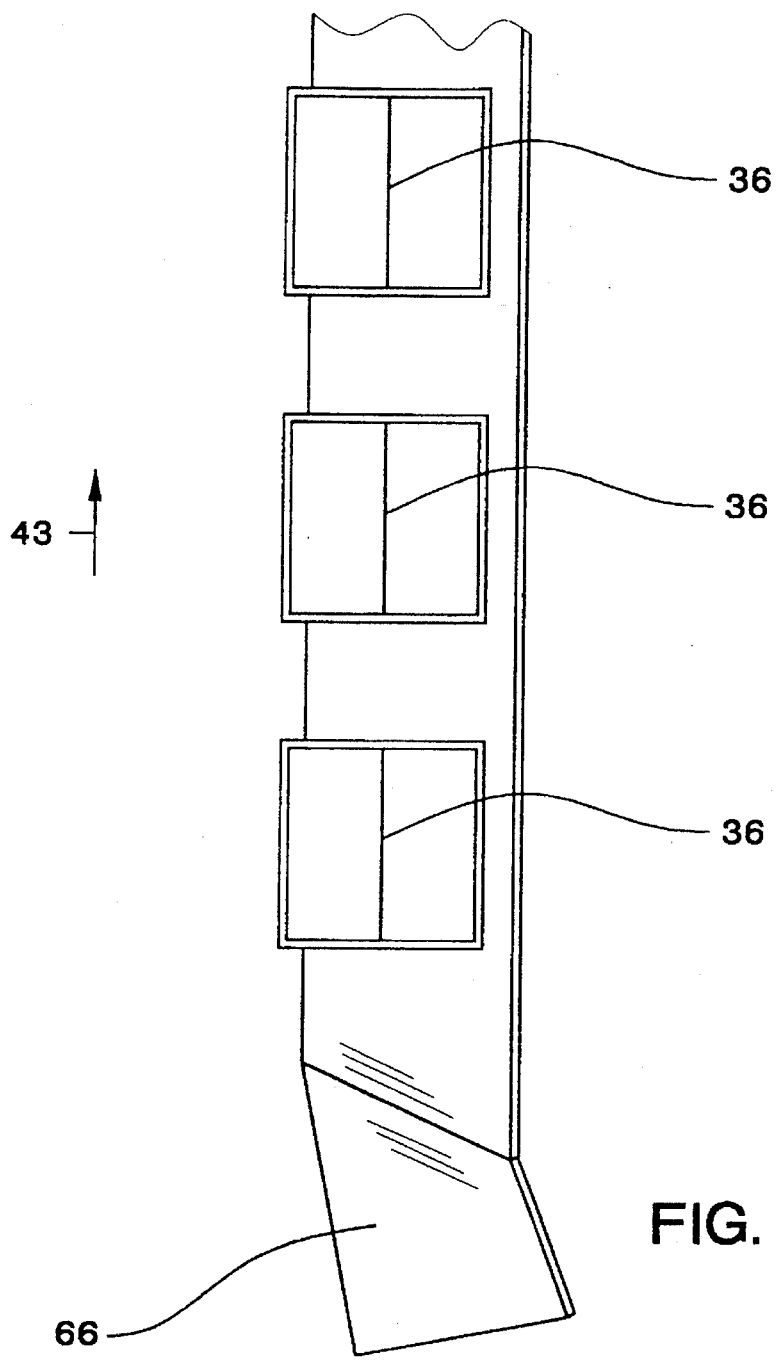
FIG. 4(A) is a top view of a pre-bending ramp disposed along the horizontal path of a conveyor.
Figure 4B:
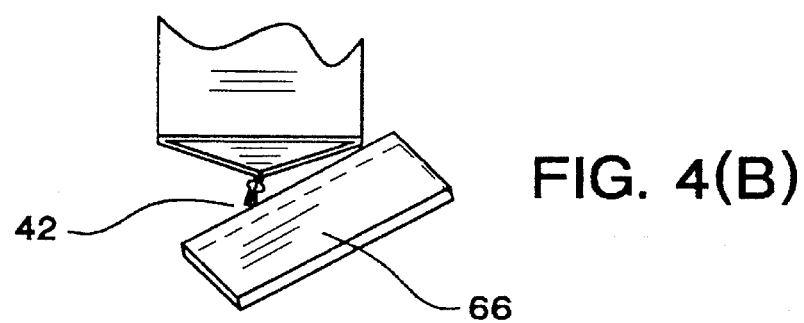
FIG. 4(B) is a perspective view of the pre-bending ramp as it makes contact with the bottom fin of a container.

During the horizontal transport to the next work station, the bottom fin 42 may be gradually pre-bent in the manner shown in FIGS. 3 and 4. Pre-bending facilitates final folding of the fin 42 to obtain a substantially planar container bottom and, further, allows the gripper 68 (described below) to obtain a better grasp of the bottom fin 42 of the container. In the fin bending apparatus depicted in FIG. 3, a pre-bending rod 64 is positioned slightly askew from the horizontal path of a carton conveyor between the sealing work station and a filling work station 88, with the top surface of the pre-bending rod 64 substantially corresponding with the uppermost portion of the bottom fin 42 of the containers on the conveyor. More particularly, as each container 10 exits from the sealing work station and is horizontally transported via the conveyor in the direction noted by arrow 37, the bottom fin 42 of the container is not in contact with the pre-bending rod 64. During the course of the horizontal transport in the direction of arrow 37, however, the leading edge of the bottom fin 42 makes contact with one side of a rounded upper surface of the pre-bending rod 64. Gradually, the entire bottom fin 42 contacts the rounded upper surface of the pre-bending rod 64 such that the bottom fin 42 is bent in the direction of arrow 39. As the container 10 is horizontally transported, the bottom fin 42 will completely pass over the pre-bending rod 64 until the bottom fin 42 is no longer in contact with the pre-bending rod 64 as the container 10 reaches the next work station.

An alternative pre-bending apparatus is depicted in FIG. 4. Upon exiting the sealing work station, the container 10 is transported via conveyor to the next work station. During transport, the leading edge of the bottom fin 42 makes contact with a pre-bending ramp 66 positioned along the horizontal path of the conveyor. The pre-bending ramp 66 is shaped to gradually make contact with one side of the bottom fin to bend the bottom fin 42 in the direction of the slope of the ramp 66 as the container 10 is horizontally transported in the direction of arrow 43.

Figure 5:
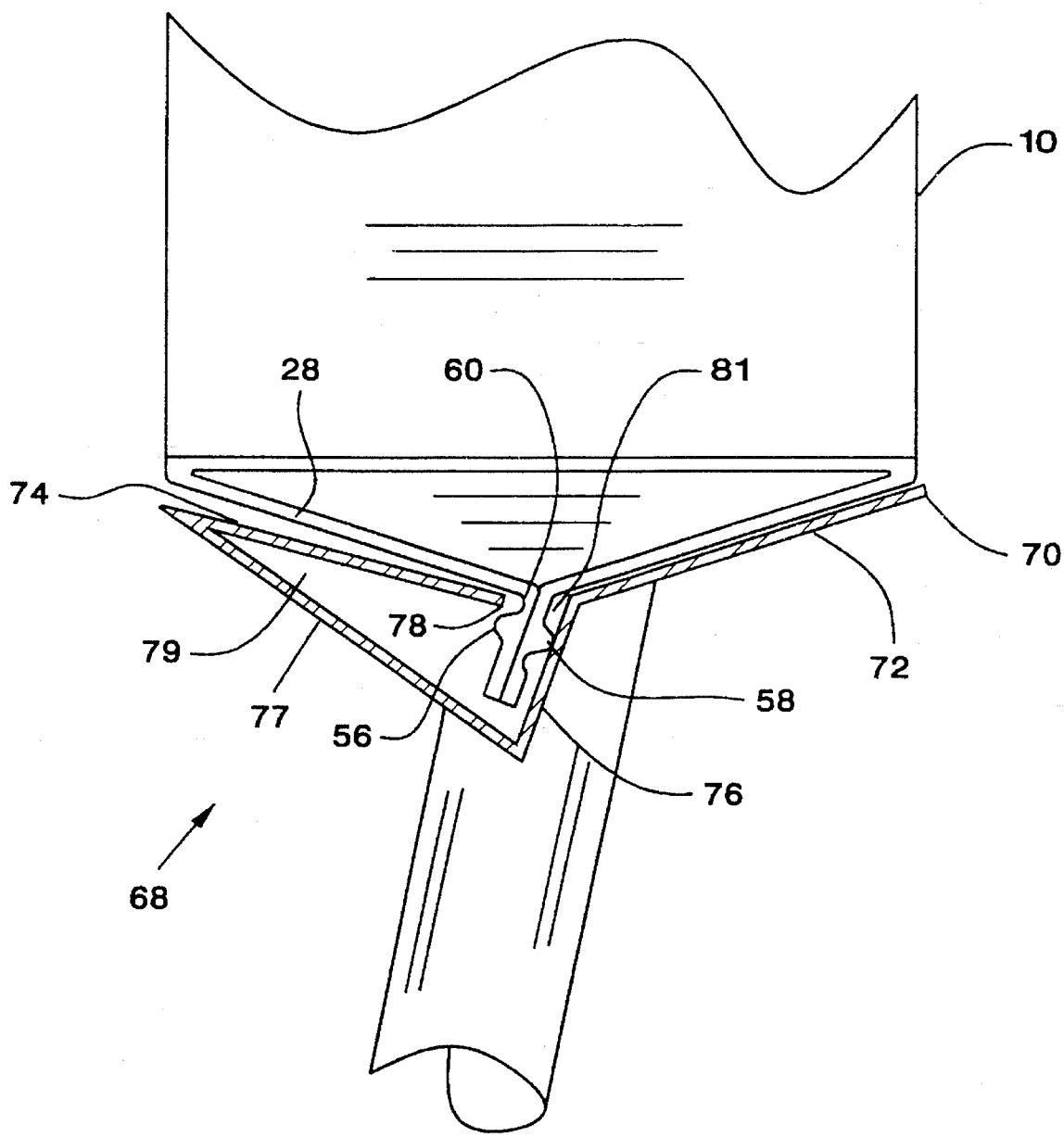
FIG. 5 is a perspective view of a single part carton gripper engaging the bottom fin of a container.

Following pre-bending, the bottom-sealed containers 10 are transferred to an engagement assembly of a lifter mechanism 84 featuring carton grippers 68 adapted to engage one or more containers 10 for vertical movement between a first and a second location. In the embodiment shown in FIG. 5, each gripper 68 includes a single rigid member bent to substantially conform to the shape of the gabled bottom of the gable-bottom container 10. The rigid member includes first and second inclined members 72 and 74 that are angled to generally conform to the shape of the overlying panels 28 and 30. The first and second inclined members 72 and 74 are disposed on opposite sides of a fin channel 76 that opens into a fin chamber 79. Inclined member 74 terminates at a gripping edge 78 proximate the fin channel 81. The inclined member 72 joins a guide member 76 proximate the fin channel 81. A connecting member 77 extends between the guide member 76 and inclined member 74 and defines the lower boundary of the fin chamber 79. As illustrated, the gripper 68 may be formed as a single integrated piece from, for example, stainless steel. Since the gripper 68 does not include any moving parts, it is generally hygienic and, further, may be easily cleaned.

In accordance with one manner of use, the transfer of the gable-bottom container 10 to the carton gripper 68 on the engagement assembly is accomplished by positioning the container 10 in the conveyor to a position directly above the gripper 68. Sufficient upward pressure is applied by the lifting mechanism 84 and gripper 68 to the container 10 to force the bottom fin 42 through the fin channel 81. As the fin 42 passes through the fin channel 81, it is guided to a resting position by the guide member 76. The first and second inclined members 72 and 74 support the overlying panels 28 and 30 of the container 10. When the container 10 is in a resting position, the gripping edge 78 is positioned near the indentation 60 of the bottom fin 42 to secure the bottom fin 42 within the fin chamber 79. The longitudinal bubbles 56 and 58 on the fin 42 prevent the fin 42 from slipping from beneath the gripping edge 78 and out of the fin chamber 79. To dislodge the container 10 from the gripper 68, pressure is applied to the container 10 in an upward direction to force the fin 42 out of the fin enclosure 79. Pressure must be sufficient to force the longitudinal bubble 56, 58 from beneath the gripping edge 78.

Figure 6:
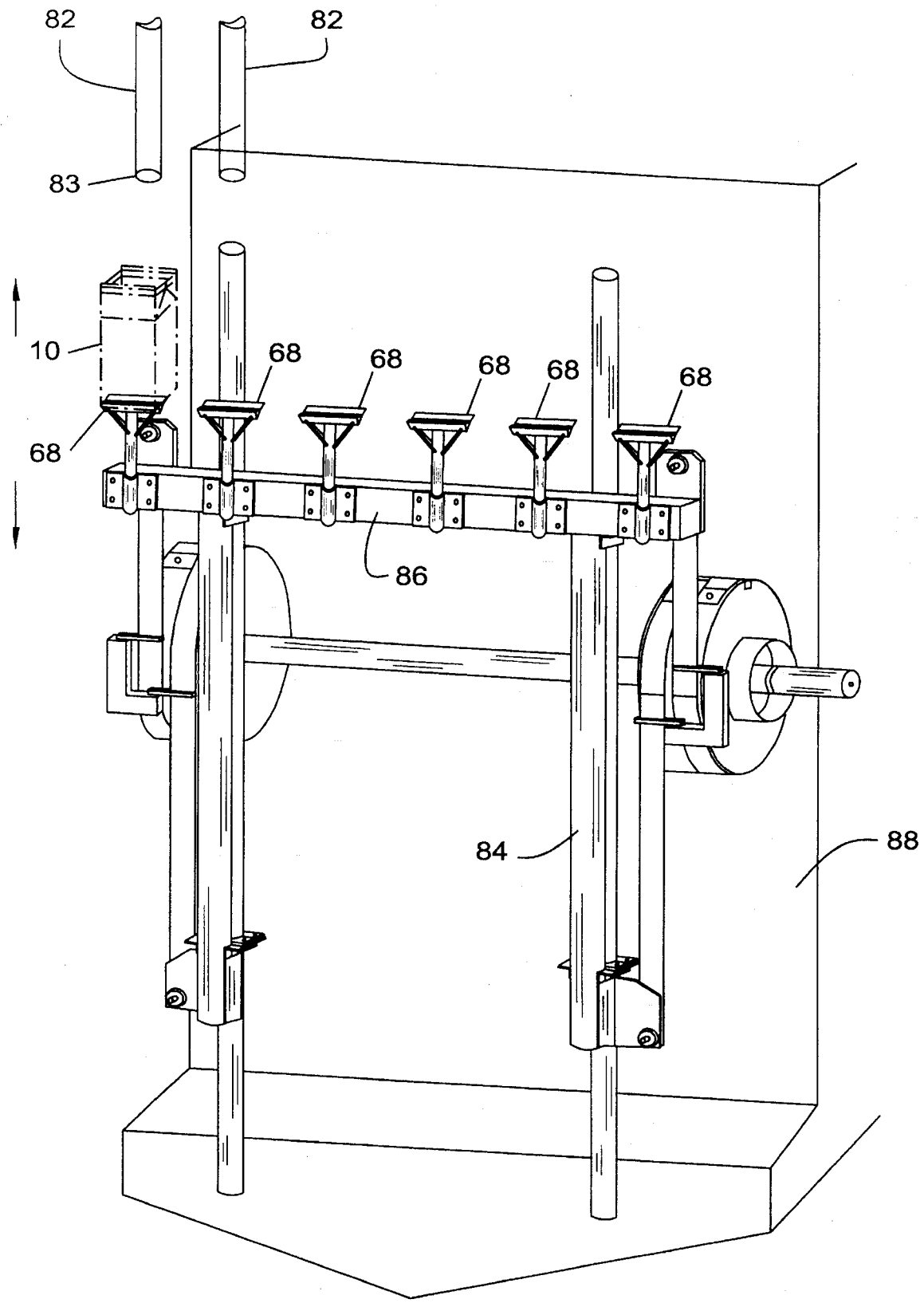
FIG. 6 is a perspective view of a carton lifter mechanism employing a plurality of the carton grippers illustrated in FIG. 5.

In a packaging machine such as the one described in the '546 application, the carton grippers 68 may be used in connection with a filling work station 88, as shown in FIG. 6. The filling work station 88 includes a plurality of fill pipes 82 and a lifting mechanism that lifts the bottom-sealed containers 10 upwards until the open ends of the tops of the containers 10 surround the nozzles of the fill pipes 80. The fill pipes 82 fill the containers 10 with a metered quantity of the desired contents while the lifting mechanism lowers the containers 10 at the same rate as the filling cycle to avoid unnecessary splashing or frothing of the contents of the containers 10. If the lifting mechanism 84 utilizes the drive mechanism set forth in concurrently filed U.S. Ser. No. 08/315,410, (Attorney Docket No. 10325US01, Corporation Docket No. TRX-0043), entitled "Belt Driven Linear Drive Apparatus For A Packaging Machine", hereby incorporated by reference, the motion profile may include four moves, as set forth therein. The velocity, acceleration, and position profiles are also described in that application.

Although the present invention has been described with reference to a specific embodiment, those of skill in the art will recognize that changes may be made thereto without departing from the scope and spirit of the invention as set forth in the appended claims.

We claim:

1. A packaging machine for manufacturing filled and sealed containers, said packaging machine comprising:

a bottom sealer including a first sealing jaw having a first face portion with a protruding sealing rib disposed thereon, and a second sealing jaw disposed substantially parallel to said sealing jaw, said second sealing jaw having a second face portion opposing said first face portion, said second face portion having a protruding counter rib thereon, said bottom sealer adapted to ultrasonically seal opposing fin panels of a gable-bottom container to form a fin, said fin having a longitudinal bubble protruding therealong formed by the rib and counter rib;

a filling station including at least one fill pipe and at least one carton gripper mounted on a drive mechanism, said carton gripper substantially corresponding to the shape of the gable-bottom container when the gable bottom of the container is sealed, said carton gripper having a gripping edge that secures said fin within a fin chamber, said bubble on said fin preventing said fin from slipping out of said fin chamber; and said drive mechanism urging said carton gripper to raise and lower said gable bottom container with respect to said fill pipe during a predetermined filling sequence.

2. The packaging machine of claim 1 wherein said carton gripper comprises:

first and second inclined members disposed on opposite sides of a fin channel, said second inclined member terminating at the gripping edge;

a guide member proximate said fin channel; and said fin chamber being defined by said guide member, said second inclined member, and a connecting member, said fin channel defining an opening to said fin chamber.

3. The packaging machine of claim 2, wherein said carton gripper is formed as a single integrated piece of metal bent to substantially correspond with the gable-bottom container.

4. An apparatus for use in a packaging machine, said apparatus comprising:

a bottom sealer for sealing opposing fin panels of a gable-bottom container to form a fin, the bottom sealer having a pattern so as to form a gripping structure on the fin;

a lifter mechanism including at least one carton gripper, said carton gripper substantially corresponding to the shape of the gable-bottom container, said carton gripper having a fin channel defined by a gripping edge that grips the fin of the gable bottom container, said gripping structure and said gripping edge cooperating to secure the fin within the fin channel when the gable-bottom container is raised by the lifter mechanism.

5. The apparatus of claim 4 wherein said carton gripper comprises:

first and second inclined members disposed on opposite sides of the fin channel, said second inclined member terminating at a gripping edge;

a guide member proximate said fin channel; and a fin chamber defined by said guide member, said second inclined member, and a connecting member, said fin channel defining an opening to said fin chamber.

6. The apparatus of claim 5, wherein said carton gripper is formed as a single integrated piece of metal bent to substantially correspond with the gable-bottom container.

7. The apparatus of claim 5 wherein the bottom sealer forms a longitudinal bubble in said fin as said gripping structure, said gripping edge engaging the longitudinal bubble to secure said fin within said fin channel.

8. A packaging machine for manufacturing filled and sealed containers, said packaging machine comprising:

a bottom sealer for sealing opposing fin panels of a gable-bottom container to form a fin having a gripping structure thereon;

a filling station including at least one fill pipe and at least one carton gripper mounted on a drive mechanism, said carton gripper substantially corresponding to the shape of the gable-bottom container when the gable-bottom of the container is sealed, said carton gripper having a fin channel for receiving the fin, the fin channel being defined by a gripping edge, the gripping structure and gripping edge cooperating to secure the fin within the fin channel; and said drive mechanism urging said gripper to raise and lower said container to said fill pipe during a predetermined filling sequence.

9. The packaging machine of claim 8 wherein said carton gripper comprises:

first and second inclined members disposed on opposite sides of the fin channel, said second inclined member terminating at a gripping edge;

a guide member proximate said fin channel; and a fin chamber defined by said guide member, said second inclined member, and a connecting member, said fin channel defining an opening to said fin chamber.

10. The packaging machine of claim 9, wherein said carton gripper is formed as a single integrated piece of metal bent to substantially correspond with the gable-bottom container.

11. The apparatus of claim 8 wherein the bottom sealer forms a longitudinal bubble in said fin as said gripping structure, said gripping edge engaging the longitudinal bubble to secure said fin within said fin channel.

* * * * *